United States Patent [19]
Schrenk

[11] B 3,924,990
[45] Dec. 9, 1975

[54] COEXTRUSION APPARATUS

[75] Inventor: Walter J. Schrenk, Bay City, Mich.

[73] Assignee: The Dow Chemical Company, Midland, Mich.

[22] Filed: Jan. 18, 1973

[21] Appl. No.: 324,739

[44] Published under the Trial Voluntary Protest Program on January 28, 1975 as document no. B 324,739.

Related U.S. Application Data

[63] Continuation-in-part of Ser. No. 183,786, Sept. 27, 1971, abandoned.

[52] U.S. Cl................................ 425/131.1; 425/462
[51] Int. Cl.² ............................................ B29F 3/12
[58] Field of Search ........... 425/130, 131, 132, 462, 425/DIG. 49; 264/171

[56] References Cited
UNITED STATES PATENTS

| | | | |
|---|---|---|---|
| 3,443,278 | 5/1969 | Nauta | 425/131 |
| 3,477,099 | 11/1969 | Lee et al. | 425/131 |
| 3,487,505 | 1/1970 | Chisholm et al. | 425/131 |
| 3,524,795 | 8/1970 | Peterson | 264/171 X |
| 3,538,544 | 11/1970 | Ullman | 425/131 |
| 3,585,685 | 6/1971 | McDermott | 425/131 |
| 3,601,846 | 8/1971 | Hudnall | 425/131 |

Primary Examiner—R. Spencer Annear
Attorney, Agent, or Firm—Robert B. Ingraham

[57] ABSTRACT

An improved coextrusion apparatus is shown which interconnects various sources of heat plastified polymer to a die having a plurality of adjacent feed passageways by means of a replaceable flow diverter which permits one extrusion setup to provide a variety of products by replacing or changing one part.

8 Claims, 10 Drawing Figures

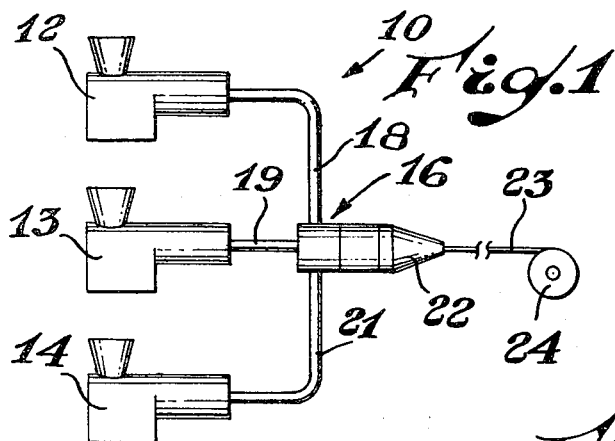
Fig.1
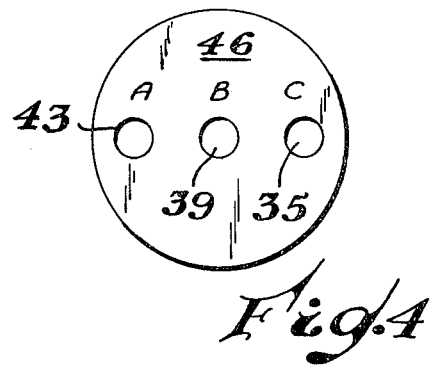
Fig.4
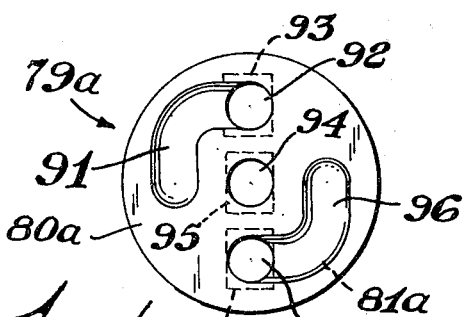
Fig.5
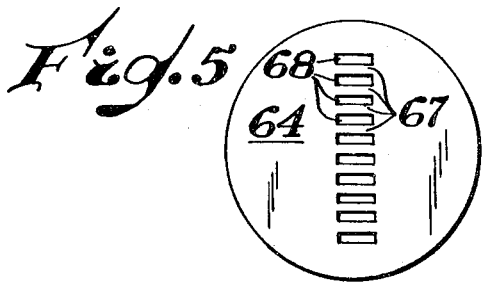
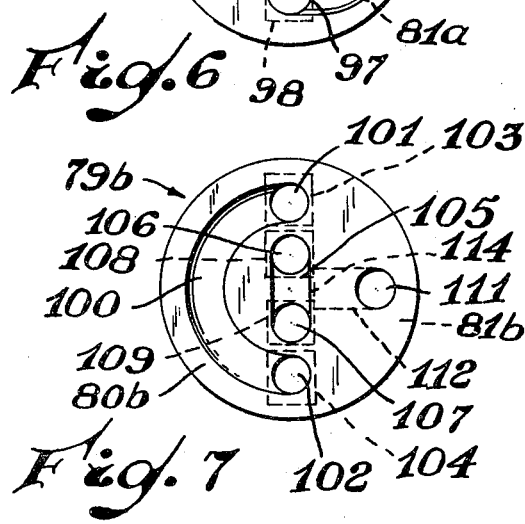
Fig.6
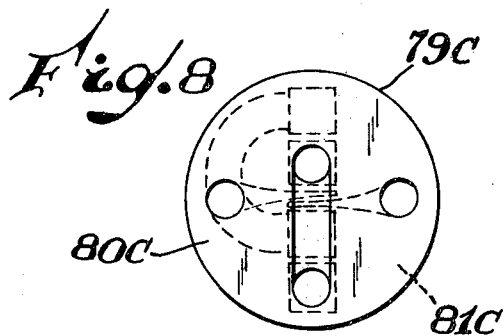
Fig.7
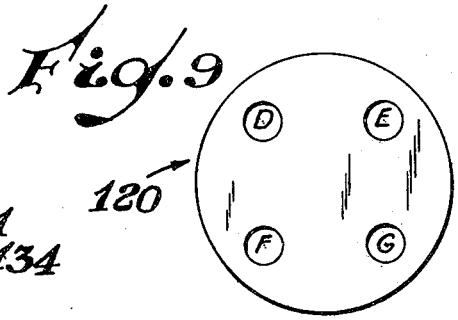
Fig.8
Fig.9
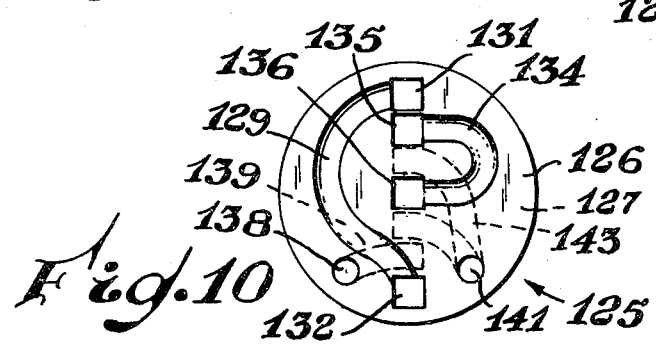
Fig.10

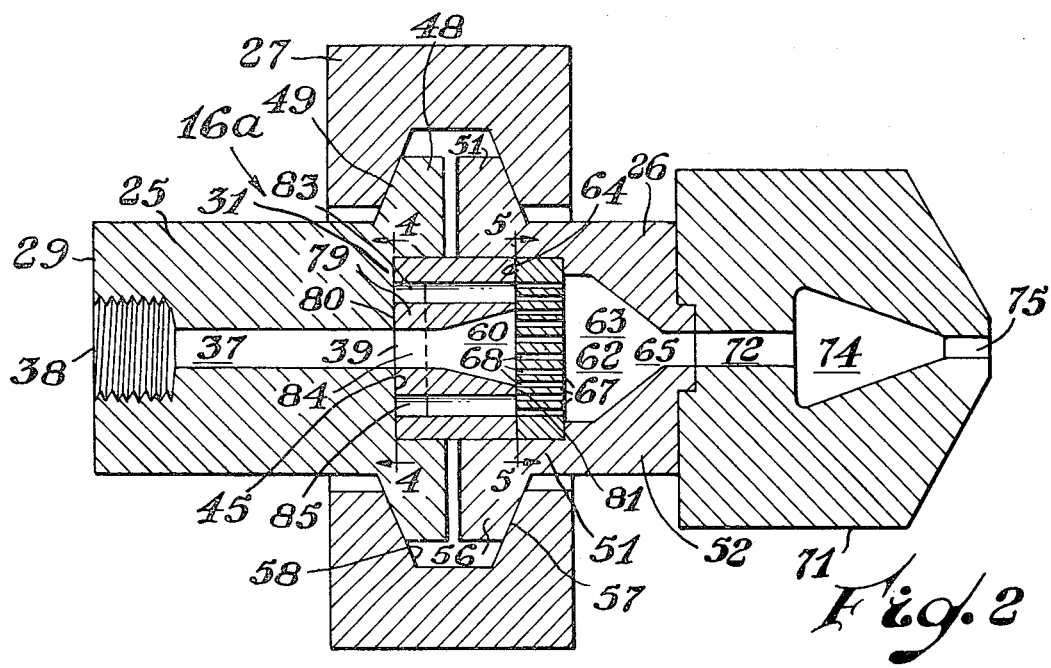
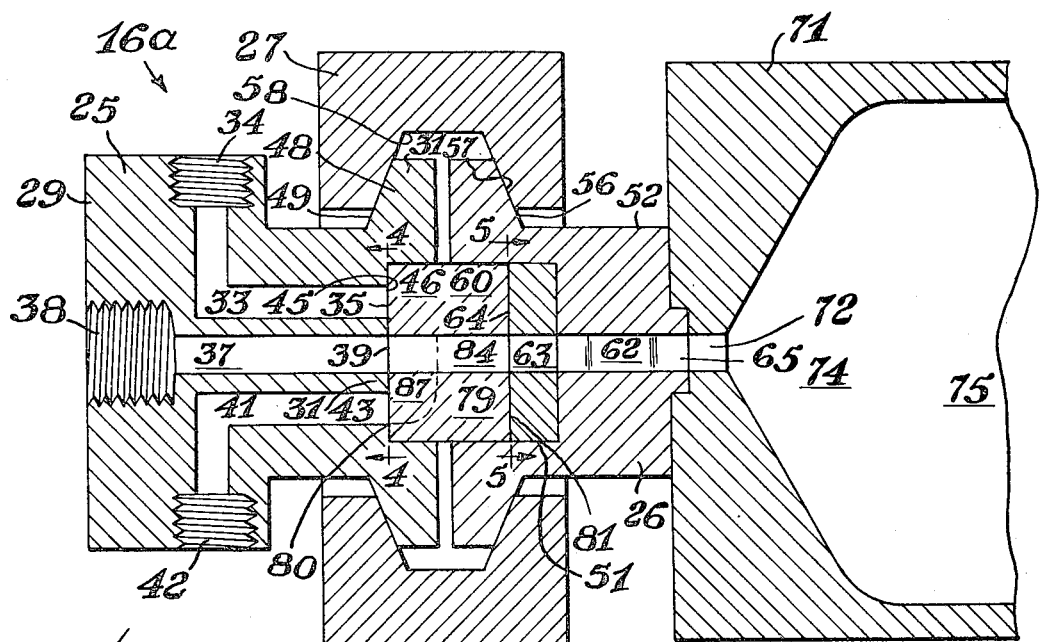

COEXTRUSION APPARATUS

This application is a continuation in part of our co-pending application Ser. No. 183,786, filed Sept. 27, 1971, now abandoned.

Coextrusion of sheet or film permits the preparation of a wide variety of laminates by the simultaneous extrusion of two or more diverse thermoplastic materials. Many of these products contain several layers; for example, one such product is disclosed in U.S. Pat. No. 3,524,795 by Peterson, herewith incorporated by reference thereto. Generally, a coextrusion train is designed for a specific product and to change from one product to another frequently requires substantial time, effort and investment in a feed manifold or feed port system peculiar to the particular product desired.

It would be advantageous if there were available an improved coextrusion apparatus which would permit rapid changeover from one layer arrangement to another.

It would also be desirable if there were available an improved versatile multiple extrusion apparatus in which layer arrangement could be altered employing a readily machined insert.

It would further be desirable if there were available an improved multiple extrusion apparatus which permitted variation of the structure of the extruded product in predetermined increments.

These benefits and other advantages in accordance with the present invention are achieved in a multiple extrusion apparatus, the multiple extrusion apparatus comprising a plurality of sources of extrudable material, a distribution manifold, the distribution manifold defining a plurality of manifold inlet passageways each adapted to receive and pass a stream of extrudable material from one of the sources, the manifold inlet passageways each having an inlet end and an outlet end, the outlet ends of the passageways terminating on a generally planar face of the manifold, the manifold defining a manifold discharge passage having inlet and outlet ends, the discharge passage inlet end terminating in a generally planar face, a die defining an elongate extrusion slot, a plenum, a die inlet feed passageway to the plenum, the feed passageway having an inlet end and an outlet end, the extrusion slot being in full communication with the inlet end of the die inlet feed passageway, the die feed passageway being in communication with the outlet of the manifold discharge passage, a replaceable insert disposed between the outlets of the manifold inlet passageways and the inlet of the manifold discharge passageway, the insert having a plurality of channels therein providing selective communication between the outlet ends of the manifold passages and the inlet end of the manifold discharge inlet passage.

Further features and advantages of the present invention will become more apparent from the following specification taken in connection with the drawing wherein:

FIG. 1 schematically depicts an apparatus in accordance with the present invention.

FIGS. 2 and 3 are two cutaway views of the die and distribution manifold of the apparatus of FIG. 1.

FIG. 4 is a view of the outlet end of the inlet passages taken along the line 4—4 of FIGS. 2 and 3

FIG. 5 is a view of the die inlet passages taken along the line 5—5 of FIGS. 2 and 3.

FIGS. 6, 7 and 8 are end views of inserts suitable for use with the apparatus of FIG. 1.

FIG. 9 is a view of the discharge ends of polymer inlet passages wherein four inlets are employed.

FIG. 10 is one embodiment of an insert suitable for use with four thermoplastic streams.

In FIG. 1 there is schematically depicted an apparatus in accordance with the present invention generally designated by the reference numeral 10. The apparatus 10 comprises in cooperative combination, first, second and third sources of heat plastified thermoplastic extrudable material designated by the reference numerals 12, 13 and 14, respectively. Beneficially, the sources are screw extruders. The extruders 12, 13 and 14 are in operative communication with a polymer distribution manifold generally designated by the reference numeral 16 by means of conduits 18, 19 and 21, respectively. The distribution manifold 16 is in operative communication with a slot or sheeting die 22 which extrudes a three component film 23 which is wound onto a roll 24.

In FIGS. 2 and 3 there is schematically depicted sectional views at 90° to each other of a distribution manifold generally designated by the reference numeral 16a suitable for use such as the apparatus 10 of FIG. 1. The manifold 16a comprises a first body portion 25, a second body portion 26, a clamp 27 adapted to maintain the body portions 25 and 26 in fixed relationship to each other. The body portion 25 has a first or inlet end 29 and a second or discharge end 31. The body portion 25 has defined therein a first manifold inlet passageway 33 having an inlet end 34 and a discharge end 35. A second polymer manifold inlet passageway 37 is defined by the body 25. The passageway 37 has a first or inlet end 38 and a second or discharge end 39. The body 25 defines a third polymer manifold inlet passageway 41 having an inlet end 42 and a discharge end 43. The body portion 25 defines a generally planar recessed face 45. The discharge ends 35, 39 and 43 of the passages 33, 37 and 41 terminate on a face 45. The body portion 25 defines a cavity 46 within the second end 31. Adjacent the second end 31 is a flange 48 having a clamp engaging camming face 49. The second body portion 26 has a first or inlet end 51 and a second or discharge end 52. The body portion 26 adjacent the inlet end 51 defines a flange 56 having a clamp engaging face 57. The clamp ring 27 beneficially defines an internal tapered groove 58 of conventional split construction, the surfaces of which engage the camming surfaces 49 and 57 and maintain the body portions 25 and 26 in generally fixed relationship to each other. The first end 51 defines a generally cylindrical internal recess 60 which is oppositely disposed and in generally mating relationship with the recess 46. The body portion 26 defines an internal manifold discharge passageway 62 having an inlet end 63 generally adjacent a generally planar face 64 partially defining the cavity 60 and about parallel to the face 45 of the body portion 25. The passageway 62 has a discharge end 65. Within the inlet end 63 are disposed a plurality of generally parallel equally spaced dividers 67 defining therebetween a plurality of feed slots 68. The feed slots 68 beneficially are of equal dimensions and provide communication between the cavity 60 and the discharge passageway 62. A die 71 is affixed to the second portion 26. The die 71 has an inlet passage 72 which in turn is in full communication with the passageway 62 and its discharge end 65. The passage 72 is in full communication with a die plenum 74 which in turn is in communication with an extrusion slot 75. The passageways or feed slots 68 are generally parallel to the slot 75 of the die 71 and in essence are stacked or disposed in a plane normal to a plane containing the axis of extrusion and the extrusion slot. A distributor block or insert 79 is disposed within the cavities 46 and 60. The distributor block 79 has a first or feed face 80 and a second or discharge face 81. Defined within the distributor block are longitudinal passageways 83, 84 and 85 which extend between the faces 80 and 81. A lateral passageway 87 is disposed within the block 79 and is formed in the face 80.

In operation of the apparatus as depicted in FIGS. 2 and 3, heat plastified thermoplastic resin is supplied to the passageways 33, 37 and 41 and discharged therefrom into the distributor block 79 which has appropriate passageways defined therein to mate with the discharge passages 35, 39 and 43. Polymer from the discharge ends passes into the block and is positioned by means of longitudinal and/or lateral passages and is directed to one or more of the feed slots 68. The configuration of feed blocks such as the block 79 will be more apparent from a consideration of FIGS. 4 through 10.

In FIG. 4 there is depicted a view of the face 46 taken along the line 4—4 of FIG. 1 showing the discharge ends 43, 39 and 35 of the apparatus of FIG. 2.

FIG. 5 is taken along the line 5—5 of FIG. 2 showing the face 64 and the location of a plurality of dividers 67 and the parallel adjacent slots 68.

In FIG. 6 there is depicted a distributor block 79a having a first surface 80a and a second surface 81a. In the surface 80a is formed a first transverse passageway 91. The passageway 91 beneficially is a groove such as is readily formed with a ball end end mill. The groove extends from a location corresponding to the location of the passageway end 43 of FIG. 4 if FIG. 4 is superimposed on FIG. 6. Thus, the passageway 91 would receive polymer from the passageway beneath the A in FIG. 4. The passageway 91 is in communication with a longitudinal passage 92 extending generally from the face 80a to the face 81a. The passageway 92 terminates on the face 81a in a generally rectangular opening 93 which is of a size sufficient to communicate with an integral number of slots such as the slots 68 of FIG. 5. The insert 79a defines a centrally disposed passage 94 which extends from the face 80a to the face 81a and terminates in the face 81a in an opening 95 which in turn is coextensive with an integral number of slots 68. A lateral passageway 96 is defined in the surface 80a and communicates with an axial passage 97 which terminates on the face 81a in a generally rectangular opening 98 corresponding to some predetermined and desired number of slots 68. If one were to superimpose FIG. 4 on FIG. 6, the slots 91 and 96 would communicate with the openings designated as A and C. Opening B would communicate with passageway 94. If, for example, the number of feed slots such as the slots 68 were equal to 10, the openings 93 and 98 each matched with three slots, the opening 95 would match or mate with four slots and, assuming equal volumetric throughput from the passages or slots 68, the extruded film would have a first layer of A, a center layer of B and a third layer of C in a proportion of 3, 4 and 3. If the plug or distributor block 79a of FIG. 6 is rotated 180°, no change in the extruded structure is observed as the block has axial symmetry.

In FIG. 7 there is depicted a distributor 79b having an upper surface 80b and a lower surface 81b. In the surface 80b an arcuate groove 100 is formed which extends about 180°. The terminal ends of the groove 100 terminate in a first axial passageway 101 and a second axial passageway 102. The passageway 102 terminates in generally rectangular openings 103 and 104, respectively, and are adapted to mate with appropriate feed slots such as the feed slots 68. A second lateral groove 105 is formed in the surface 80b and terminates in axial passages 106 and 107, respectively, which in turn terminate on the face 81b with rectangular openings 108 and 109, respectively, which in turn match with appropriate feed slots such as the slots 58. A generally axial passageway 111 is defined in the block 79b and extends from the face 80b to the face 81b. From the face 81b the passageway 111 is in communication with a lateral passageway 112 which is in communication with a plurality of feed slots, not shown, at a location generally designated by the reference numeral 114. If one superimposes FIG. 4 on FIG. 7, the slot 100 receives feed from the passage A, passage B feeds slot 105 and passage C feeds passage 111, distributing the flow in the arrangement ABCBA. Rotation of the diverter 79b in a plane of the paper 180° results in feed of CBABC.

In FIG. 8 there is depicted a block or distributor 79c having an upper face 80c and a lower face 81c and prepared substantially in the same manner as the blocks of FIGS. 6 and 7 wherein the solid circles represent axial passageways and the solid parallel lines represent a lateral groove on the face 80c and the dotted lines indicate passageways formed in the face 81c terminating in generally rectangular openings corresponding to feed slots such as the feed slots 68. If the feed pattern of FIG. 4 is employed, the resultant extruded product has a configuration of ABACAB and if rotated 180°, the feed pattern is CBCACB.

In FIG. 9 there is depicted an alternate arrangement of feed ports generally designated by the reference numeral 120 wherein four feed ports, D, E, F and G are arranged in a generally square or rectangular pattern.

FIG. 10 schematically depicts a distributor block 125 suited for use with a four inlet feed arrangement such as that depicted in FIG. 9. The block 125 has an upper surface 126 and a lower surface 127. In the upper surface 126 is defined a channel 129 adapted to receive feed from the port D. The channel 129 terminates at either end in two axial passageways 131 and 132 adapted to feed appropriate feed slots such as the slots 58. A second channel 134 is formed in the upper surface and terminates in axial passageways 135 and 136 again communicating with appropriately arranged feed slots such as the slots 68. The slot 134 receives material from feed port E of FIG. 9. A passage 138 extends from the first surface 126 to the second surface 127 which has a lateral passage 139 formed therein and terminates adjacent the passage 132. Thus, polymer from the feed designated as F in FIG. 9 passes axially through the passage and laterally to the appropriate feed slot. A further axial passageway 141 extends from the surface 126 to the surface 127 and is in communication with a bifurcated lateral passageway 143 formed in the surface 127. The passageway 143 terminates at a location between the passageways 135 and 136 and between the passageways 136 and 139. Thus, employing the feed arrangement and feed block of FIG. 10, in an apparatus similar to the apparatus of FIG. 10 but provided with four polymer feeds, the resultant configuration of the product is DEGEGFD.

As depicted in FIGS. 6–10, the flow diverter is of one piece construction which is generally adequate for many desired multilayer films. More complex structures can be prepared utilizing a feed block with curved or angularly disposed internal passageways. However, from a preparation and maintenance standpoint such flow diverters are often undesirable. In instances where more complex configurations are desired, a two piece flow diverter is prepared; for example, by dividing a distributor block blank or insert at a plane generally parallel to the first and second discharge faces 80 and 81. Thus, a third interface is provided which permits lateral transfer of heat plastified material to a desired location on the discharge face. In such a divided structure lateral transfer using an open channel configuration in the block or flow diverter can be had at the feed face corresponding to the face 80, at the discharge face corresponding to the face 81, and at the intermediate face lying therebetween. Generally it is particularly beneficial to employ feed blocks which can be simply fabricated; that is, diverters having slots formed for lateral transfer and axial passages for axial transfer, as it avoids complex machining procedures and permits ready fabrication with minimum time and tooling. A particularly desirable configuration for the feed block is generally that of a right cylinder.

Apparatus in accordance with the present invention is beneficially employed with any extrudable materials and is employed with particular advantage with thermoplastic synthetic resins.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

I claim:

1. A multiple extrusion apparatus, the multiple extrusion apparatus for the preparation of resinous film or sheet comprising
   a plurality of sources of extrudable material,
   a distribution manifold, the distribution manifold defining
   a plurality of manifold inlet passageways each adapted to receive and pass a stream of extrudable material from one of the sources, the manifold inlet passageways each having
   an inlet end and
   an outlet end, the outlet ends of the passageways terminating on a generally planar face of the manifold, the manifold defining
   a manifold discharge passage having inlet and outlet ends, the discharge passage inlet end terminating in a generally planar face,
   a slot die defining an elongate extrusion slot,
   a die plenum in connection with the extrusion slot,
   a die inlet feed passageway in communication with the plenum, the feed passageway having
   an inlet end and
   an outlet end, the extrusion slot being in full communication with the inlet end of the die inlet feed passageway, the die feed passageway being in communication with the outlet of the manifold discharge passage,
   a replaceable insert disposed between the outlets of the manifold inlet passageways and the inlet of the manifold discharge passageway, the insert having a plurality of channels therein providing selective communication between the outlet ends of the manifold passages and the inlet end of the manifold discharge inlet passage wherein the insert has a first end and a second end, the first end being disposed in mating relationship with the generally planar face of the manifold adjacent the outlet ends of the manifold inlet passages and the second end being disposed in mating relationship with the planar face of the manifold adjacent the inlet end of the manifold discharge passage.

2. The apparatus of claim 1 wherein the inlet end of the manifold outlet passageway comprises a plurality of generally parallel inlet slots, each of the inlet slots being generally parallel to the extrusion slot.

3. The apparatus of claim 2 wherein the slots are of equal dimensions.

4. The apparatus of claim 1 wherein the insert has the general configuration of a right cylinder.

5. A multiple extrusion apparatus, the multiple extrusion apparatus for the preparation of resinous film or sheet comprising
   a plurality of sources of extrudable material,
   a distribution manifold, the distribution manifold defining
   a plurality of manifold inlet passageways each adapted to receive and pass a stream of extrudable material from one of the sources, the manifold inlet passageways each having
   an inlet end and
   an outlet end, the outlet ends of the passageways terminating on a generally planar face of the manifold, the manifold defining
   a manifold discharge passage having inlet and outlet ends, the discharge passage inlet end terminating in a generally planar face,
   a slot die defining an elongate extrusion slot,
   a die plenum in connection with the extrusion slot,
   a die inlet feed passageway in communication with the plenum, the feed passageway having
   an inlet end and
   an outlet end, the extrusion slot being in full communication with the inlet end of the die inlet feed passageway, the die feed passageway being in communication with the outlet of the manifold discharge passage,
   a replaceable insert disposed between the outlets of the manifold inlet passageways and the inlet of the manifold discharge passageway, the insert having a plurality of channels therein providing selective communication between the outlet ends of the manifold passages and the inlet end of the manifold discharge inlet passage wherein the insert has a first end and a second end, the first end being disposed in mating relationship with the generally planar face of the manifold adjacent the outlet ends of the manifold inlet passages and the second end being disposed in mating relationship with the planar face of the manifold adjacent the inlet end of the manifold discharge passage and a portion of the channels therein extending generally perpendicular to the first and second end, at least one channel extending generally parallel to the first and second ends.

6. The apparatus of claim 5 wherein the inlet end of the manifold outlet passageway comprises a plurality of generally parallel inlet slots, each of the inlet slots being generally parallel to the extrusion slot.

7. The apparatus of claim 6 wherein the slots are of equal dimensions.

8. The apparatus of claim 6 wherein the insert has the general configuration of a right cylinder.

* * * * *